United States Patent
Chow et al.

(10) Patent No.: US 7,480,633 B2
(45) Date of Patent: Jan. 20, 2009

(54) REAL-TIME BROKERAGE ACCOUNT APPLICATION SYSTEM AND METHOD

(75) Inventors: Christina Chow, Phoenix, AZ (US); Paul Stoxen, Phoenix, AZ (US); Marcus Sheire, St. Paul, MN (US); Timothy G. Austin, Maple Grove, MN (US)

(73) Assignee: American Express Bank Ltd., New York, NY (US)

( * ) Notice: Subject to any disclaimer, the term of this patent is extended or adjusted under 35 U.S.C. 154(b) by 586 days.

(21) Appl. No.: 10/032,588

(22) Filed: Dec. 20, 2001

(65) Prior Publication Data

US 2002/0156720 A1    Oct. 24, 2002

Related U.S. Application Data

(60) Provisional application No. 60/268,658, filed on Feb. 14, 2001, provisional application No. 60/268,538, filed on Feb. 13, 2001.

(51) Int. Cl.
G06Q 40/00 (2006.01)

(52) U.S. Cl. .................. 705/37; 705/35; 705/36 R; 705/38

(58) Field of Classification Search .......... 705/35–38, 705/40, 1
See application file for complete search history.

(56) References Cited

U.S. PATENT DOCUMENTS

| | | | |
|---|---|---|---|
| 4,346,442 A * | 8/1982 | Musmanno | ........... 705/36 |
| 4,694,397 A | 9/1987 | Grant et al. | |
| 4,751,640 A | 6/1988 | Lucas et al. | |
| 4,823,265 A | 4/1989 | Nelson | |
| 5,220,501 A | 6/1993 | Lawlor et al. | |
| 5,262,942 A | 11/1993 | Earle | |
| 5,611,052 A | 3/1997 | Dykstra et al. | |
| 5,677,955 A | 10/1997 | Doggett et al. | |
| 5,696,907 A | 12/1997 | Tom | |
| 5,706,442 A | 1/1998 | Anderson et al. | |
| 5,745,706 A | 4/1998 | Wolfberg et al. | |
| 5,787,404 A | 7/1998 | Fernandez-Holmann | |
| 5,794,210 A * | 8/1998 | Goldhaber et al. | ........... 705/14 |
| 5,866,889 A | 2/1999 | Weiss et al. | |
| 5,870,721 A | 2/1999 | Norris | |
| 5,875,437 A * | 2/1999 | Atkins | ........... 705/40 |
| 5,899,982 A | 5/1999 | Randle | |
| 5,940,809 A * | 8/1999 | Musmanno et al. | ........... 705/35 |
| 5,991,750 A | 11/1999 | Watson | |
| 6,014,645 A | 1/2000 | Cunningham | |
| 6,064,986 A | 5/2000 | Edelman | |

(Continued)

OTHER PUBLICATIONS

T.Rowe Price, Frequently Asked Questions, T.Rowe Price Investment Services, Inc., available from http://web.archive.org Dec. 1, 2000.*

(Continued)

*Primary Examiner*—Stefanos Karmis
(74) *Attorney, Agent, or Firm*—Snell & Wilmer L.L.P.

(57) ABSTRACT

A system and method for processing a brokerage account application in a substantially real-time environment, where a host system retrieves Applicant data via a distributed network, communicates with a credit bureau system to obtain credit decisioning and approval; establishes an Applicant account, activates the account and obtains a username and password, which, upon receipt, allows the Applicant/account-holder to begin placing trades.

13 Claims, 12 Drawing Sheets

U.S. PATENT DOCUMENTS

| | | |
|---|---|---|
| 6,088,686 A | 7/2000 | Walker et al. |
| 6,105,007 A | 8/2000 | Norris |
| 6,119,104 A | 9/2000 | Brumbelow et al. |
| 6,131,810 A | 10/2000 | Weiss et al. |
| 6,135,349 A | 10/2000 | Zirkel |
| 6,154,729 A | 11/2000 | Cannon et al. |
| 6,226,623 B1 * | 5/2001 | Schein et al. .................. 705/35 |
| 6,247,001 B1 * | 6/2001 | Tresp et al. .................... 706/15 |
| 6,269,346 B1 * | 7/2001 | Cristofich et al. ............. 705/37 |
| 6,317,728 B1 * | 11/2001 | Kane ............................ 705/37 |
| 6,354,490 B1 * | 3/2002 | Weiss et al. ................. 235/379 |
| 6,405,181 B2 * | 6/2002 | Lent et al. ..................... 705/38 |
| 6,408,282 B1 * | 6/2002 | Buist ............................ 705/37 |
| 6,484,151 B1 * | 11/2002 | O'Shaughnessy ............ 705/36 |
| 6,513,019 B2 * | 1/2003 | Lewis ........................... 705/35 |
| H2064 H * | 5/2003 | Buchalter .................... 705/37 |
| 6,941,279 B1 * | 9/2005 | Sullivan ....................... 705/35 |
| 6,968,317 B1 * | 11/2005 | Wallace et al. ............ 705/36 R |
| 2002/0156720 A1 * | 10/2002 | Chow et al. ................... 705/37 |

OTHER PUBLICATIONS

Huntley, H. Buying stocks with borrowed money is popular, precarious means of investing; Daily Breeze, Torrance, CA, Apr. 29, 2000, p. F.2.*

* cited by examiner

FIG.6

| FILE EDIT VIEW FAVORITES TOOLS HELP |
| BACK FORWARD STOP REFRESH HOME | SEARCH FAVORITES HISTORY CHANNELS | FULLSCREEN MAIL PRINT EDIT |
| ADDRESS WWW.HOSTSYSTEM.COM | LINKS>> |

HOST SYSTEM | HOME / PERSONAL / ○ SMALL BUSINESS ⊙ CORPORATIONS \
• CUSTOMER SERVICE | • SITE DIRECTORY | • ABOUT THE COMPANY

EMPLOYMENT INFORMATION                                    PAGE 3 OF 9

ACCOUNT HOLDER
PLEASE SELECT ONE. REQUIRED FIELDS MUST BE
COMPLETED IF YOU ARE EMPLOYED OR SELF-EMPLOYED.
○ EMPLOYED   ○ SELF EMPLOYED
○ RETIRED/STUDENT/HOMEMAKER
EMPLOYER NAME*
[                    ]

EMPLOYER ADDRESS*
[                    ]

OCCUPATION*
[                    ]

YEARS WITH EMPLOYER*
[        ]

I AM AFFILIATED WITH AN INVESTMENT FIRM, BROKER-DEALER
OR BANK. THE NAME AND ADDRESS IS:
[                    ]

LOCAL INTRANET ZONE

FIG. 7

FINANCIAL INFORMATION

PAGE 4 OF 9

WE ARE REQUIRED BY INDUSTRY REGULATIONS TO AS FOR THIS INFORMATION.

ANNUAL INCOME*   LIQUID NET WORTH*   TOTAL NET WORTH*

| FEDERAL INCOME TAX BRACKET* | INVESTMENT OBJECTIVE* | RISK TOLERANCE* | INVESTMENT EXPERIENCE* |
|---|---|---|---|
| ○ 15% | ○ CAPITAL PRESERVATION | ○ CONSERVATIVE | ○ LITTLE |
| ○ 28% | ○ CAPITAL APPRECIATION | ○ CONSERVATIVE/MODERATE | ○ MODERATE |
| ○ 33% | ○ INCOME | ○ MODERATE | ○ EXTENSIVE |
| | ○ TAX CONSIDERATIONS | ○ MODERATE/AGGRESSIVE | |
| | ○ PROTECTION | ○ AGGRESSIVE | |

[CONTINUE] [CANCEL]

FIG.8

AMERICAN EXPRESS

HOME | PERSONAL | ⊙ SMALL BUSINESS ⊙ CORPORATIONS
• CUSTOMER SERVICE | • SITE DIRECTORY | • ABOUT THE COMPANY

PAGE 5 OF 9

ACCOUNT FEATURES

INITIAL ACCOUNT FUNDING INFORMATION*
○ CHECK
○ WIRE TRANSFER
○ ACCOUNT TRANSFER
○ PHYSICAL SECURITES CERTIFICATE(S)

ADDITIONAL INSTRUCTIONS AND FORMS WILL BE AVAILABLE AFTER YOU COMPLETE THIS APPLICATION. YOUR OPENING BALANCE MAY BE IN CASH, SECURITIES, AND/OR MUTUAL FUNDS.

MONEY SETTLEMENT OPTIONS
MONEY SETTLEMENT OPTIONS AND WHERE YOUR MONEY IS KEPT BETWEEN INVESTMENTS. YOUR MONEY IS SWEPT DAILY TO YOUR SELECTED OPTION.
TAXABLE
○ HOST SYSTEM CASH      ○ U.S. GOVERNMENT
○ PRIMARY PORTFOLIO     ○ U.S. TREASURY

TAX-EXEMPT:
○ INTERSTATE           ○ MICHIGAN

FIG. 9

BROKERAGE ACCOUNT AUTHORIZATION                                    PAGE 7 OF 9

AFTER READING THE FOLLOWING AGREEMENT(S), PLEASE TYPE YOUR SIGNATURE BELOW. BEFORE PRESSING CONTINUE, PLEASE PRINT THIS PAGE IF YOU HAVE ACCESS TO A PRINTER. YOU WILL NEED TO SEND THIS TO US WITH YOUR SIGNATURE. IF YOU DO NOT HAVE A PRINTER, WE WILL MAIL YOU A CERTIFICATION LETTER FOR YOUR SIGNATURE.

MAILING ADDRESS:

HOST SYSTEM

SIGNATURES (ALL CLIENTS MUST COMPLETE BELOW)

I AM SIGNING FOR ALL SELECTED ACCOUNT FEATURES IN THE ACCOUNT FEATURES SECTION OF THIS APPLICATION.

I CONFIRM THAT I AM AT LEAST 18 YEARS OF AGE AND OF FULL LEGAL AGE IN MY STATE OF RESIDENCE.

I AUTHORIZE

☑ CHECK HERE IF YOU DO NOT AGREE TO HAVE A MARGIN ACCOUNT WITH HOST SYSTEM.

FIG. 10

YOU ARE ALMOST FINISHED WITH YOUR HOST SYSTEM BROKERAGE APPLICATION!

PAGE 8 OF 9

PLEASE TAKE A MOMENT TO REVIEW YOUR APPLICATION FOR ACCURACY AND MAKE ANY CHANGES NECESSARY VIA THE EDIT BUTTON.

BEFORE SUBMITTING YOUR APPLICATION, PLEASE PRINT THIS SUMMARY PAGE IF YOU HAVE ACCESS TO A PRINTER. YOU WILL NEED TO SEND THIS SUMMARY PAGE ALONG WITH THE BROKERAGE ACCOUNT AUTHORIZATION PAGES WITH YOUR SIGNATURE WITHIN 21 DAYS OF SUBMITTING YOUR APPLICATION.

MAILING ADDRESS:
HOST SYSTEM
P.O. BOX
ANYTOWN, USA

ACCOUNT HOLDER INFORMATION [EDIT]

ACCOUNT HOLDER INFORMATION
FIRST NAME: JOE
MIDDLE NAME:
LAST NAME: SMITH
HOME ADDRESS: 123 LONG STREET
CITY: PHOENIX STATE: AZ ZIP: 12345
BUSINESS PHONE:
EMAIL:
MOTHER'S MAIDEN NAME: MON

SOCIAL SECURITY NUMBER: 333-23-1212

CITIZEN OF:
US STATE OF TAX RESIDENCE: AR
HOME PHONE: 602.111.2222
DATE OF BIRTH: 11/11/1911
DRIVER'S LICENSE NUMBER: STATE:

REAL-TIME BROKERAGE ACCOUNT APPLICATION SYSTEM AND METHOD

CROSS REFERENCE TO RELATED APPLICATIONS

This application claims priority to, and the benefit of, U.S. Provisional Application Ser. No. 60/268,658, filed Feb. 14, 2001, and U.S. Provisional Application Ser. No. 60/268,538 filed on Feb. 13, 2001, both of which are hereby incorporated by reference.

FIELD OF INVENTION

The present invention relates generally to a securities trading and brokerage account application processing system, and in particular, to a system and method for facilitating real-time brokerage account decisioning and approval over a distributed network.

BACKGROUND OF THE INVENTION

The traditional method of establishing a brokerage account with a broker involves the process of completing a brokerage account application, selecting a type of brokerage account, signing the application, submitting the application and funding the brokerage account. Typically, not until the application papers have been received and processed and the brokerage account funded (check clears, wire transfer complete, etc.) will an account holder be able to start trading on an account. Additionally, many brokers often require an Applicant to submit to a credit evaluation which may also delay the start of trading. With the changing market environments, volatility of the stock market, increases in trading volume, and high turn-around in everyday trading activity, along with other changes to investor behavior, investors are increasingly looking for ways to expedite the brokerage account application process so as to take advantage of these changing market conditions. In other words, investors do not wish to wait for a week, or even a day, until application papers are received and processed or for a check to clear.

A few online brokerage companies have recently entered the competition for investor business and have addressed some of the investor desires for expedited processing of brokerage applications. These online companies have expedited some of the processes by allowing the completion of the brokerage application online, thereby eliminating some of the delays associated with mailing the application to and from the broker. These online brokerage companies, however, have typically not allowed the Applicant to apply and get approved in a real-time environment for a brokerage account. In other words, although a brokerage account may be applied for online, the investor-Applicant must often wait until a later point in time for account approval. And, not until some later point in time is the Applicant then able to place a trade. Furthermore, not only is the online investor-applicant traditionally not able to complete the brokerage application process during the same online session, but the investor-applicant is not able to fund the account immediately. A need exists to overcome traditional problems of the prior art by allowing the investor-applicant to not only complete an online application in one online session, but to begin trading with a pre-established trading limit as well.

SUMMARY OF THE INVENTION

The present invention relates to a system and method for processing a brokerage account application in a real-time environment. A real-time application processing system is disclosed which provides a comprehensive brokerage account application process for receiving and processing an Applicant's personal and financial data, evaluating Applicant's credit status, opening a brokerage account, activating the brokerage account, funding the account and providing applicant/accountholder with a username and password to allow applicant/account holder to begin trading within minutes. An exemplary embodiment of this invention comprises a host system, one or more credit bureau systems and one or more trading systems, where the host system further comprises a user interface system for accepting application data from a user, an application server for processing data, and suitable interface systems and protocols to communicate with external credit bureau and trading systems to effect the desired credit processing and trading requests.

BRIEF DESCRIPTION OF THE DRAWINGS

Additional aspects of the present invention will become evident upon reviewing the non-limiting embodiments described in the specification and the claims taken in conjunction with the accompanying figures, wherein like reference numerals denote like elements.

FIGS. 3-12 illustrate exemplary screen shots of the online brokerage application process of the present invention.

DETAILED DESCRIPTION OF EXEMPLARY EMBODIMENTS

The present invention generally relates to a comprehensive real-time account application processing and decisioning system and method for accepting applicant data, processing applicant data, making a credit decision, processing user authentication data (e.g., username and password) and, in an exemplary embodiment, establishing an applicant brokerage account with a pre-established trading limit or line of credit. This system and method enables an applicant to set-up a brokerage account and begin trading online in a real-time environment. As such, an exemplary system may set, for example, a 60 second period of response from a credit system, so as to return a response to an Applicant before the Applicant's browser times-out (typically two minutes).

Figure 1:
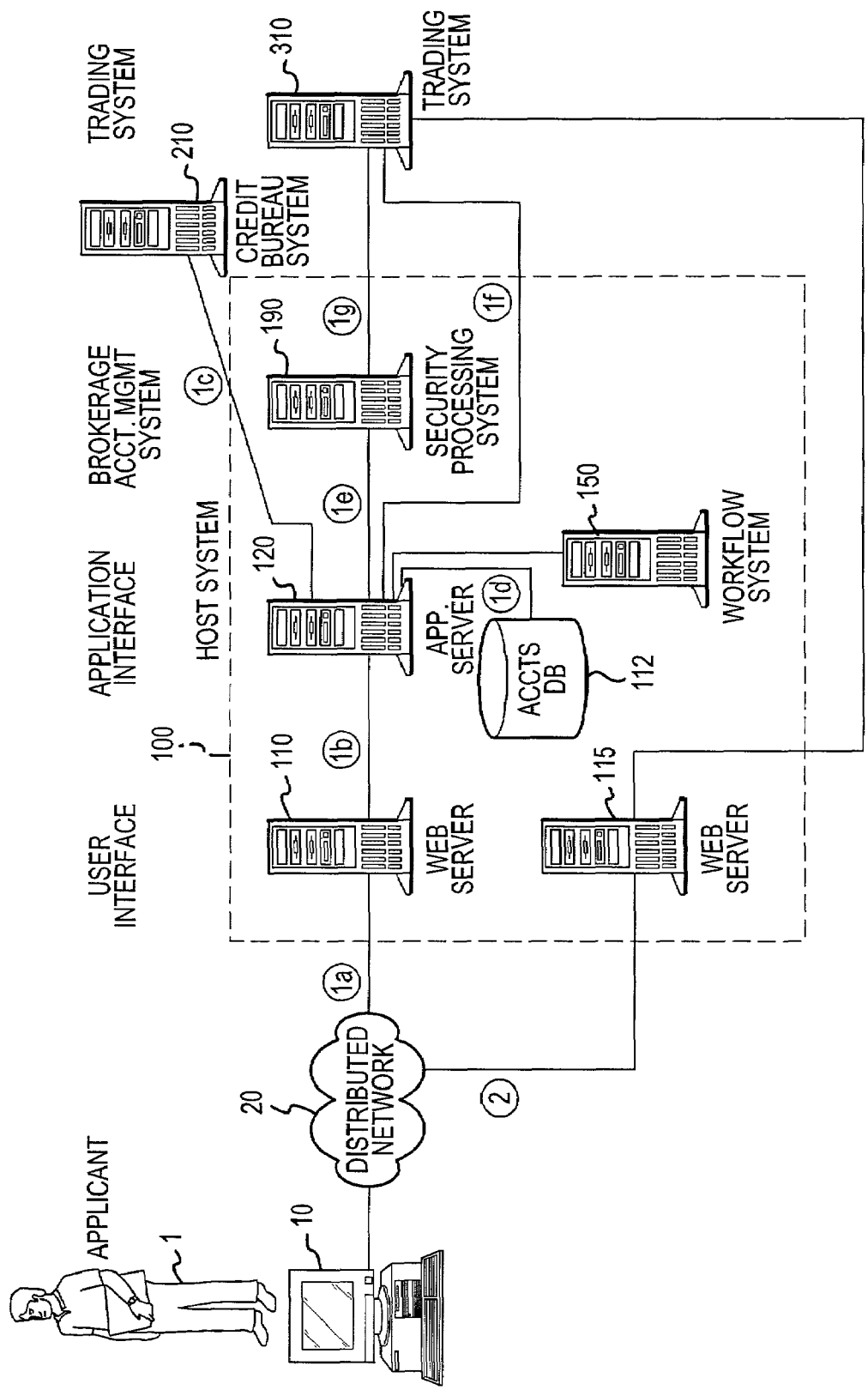
FIG. 1 illustrates a block diagram of exemplary components and an exemplary process for the present invention.
Figure 2:
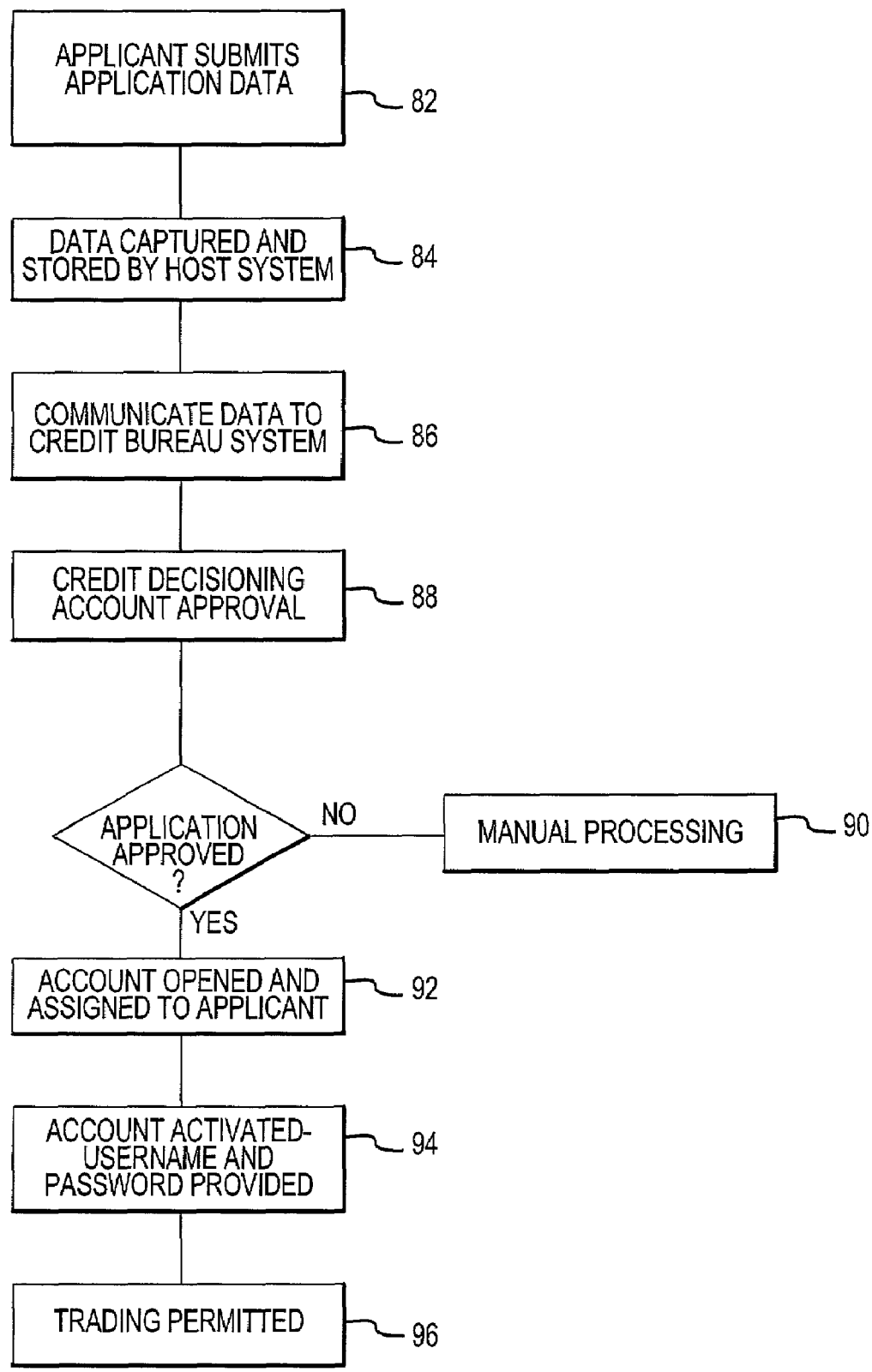
FIG. 2 is a flow diagram of an overview of exemplary processes of the present invention.

By way of a general overview, exemplary components of the present invention are illustrated in FIG. 1 and an overview of an exemplary real-time application approval process is illustrated in FIG. 2. Web page screen shots are provided to further illustrate the process of applying for an account in a real-time environment.

An exemplary real-time application system comprises a number of servers, databases, interfaces, software routines, protocols, etc. These components, as one skilled in the art will appreciate, may be configured in any number of ways to achieve or facilitate the functionality desired. As illustrated in FIG. 1, for example, the present invention generally comprises a Host System 100, a Trading System 310, and a Credit Bureau System 210. The Host System 100 interfaces with the Credit Bureau System 210 over a suitable computer network and using appropriate transmission protocols. The Host System 100 is also configured to communicate with a Trading System 310, which is capable of receiving an Applicant's 1 trade request and placing Applicant's order. The Host System 100 is further configured to process and communicate data in a real-time environment. As such, as depicted in FIG. 1, the Host System 100 comprises, in an exemplary embodiment: (1) a user interface system such as a web server 110 for posting and retrieving data, (2) an Application Server 120 for capturing and processing data, (3) a Securities Processing System 190 for activating and managing the account, and (4) a workflow management system 150 to facilitate, inter alia, manual data processing and system backup. Additionally, the Host System 100 comprises one or more databases, such as the accounts database 112. These systems work together in a manner described herein to achieve a novel real-time account application system, which may preferably be used to facilitate the opening of a brokerage account to allow real-time trading.

A general overview of an exemplary process of the present invention is now provided in reference to FIG. 1. First, an Applicant 1 using a suitably configured computer system, applies for a brokerage account with Host System 100 over a Distributed Network 20, where application data is received (STEP 1a) by the Web Server 110. The Host System Application Server 120 then captures the data (STEP 1b), formats the data and passes the data to a Credit Bureau System 210 for account decisioning/approval (STEP 1c). In an exemplary embodiment, the formatting and communication process between the Host System 100 and the Credit Bureau System 210 is facilitated with a credit bureau interface, which although not show in FIG. 1, resides within the Host System as an interface between the Application Server 120 and the Credit Bureau System 210. Upon approval, an account with a pre-established trading limit is accessed (STEP 1d) and opened through the Securities Processing System 190 (STEP 1e), whereupon the Application Server 120 requests account activation from a Trading System 310 (STEP 1f). Finally, the Trading System 310 provides the Security Processing System 190 with user authentication information (e.g., username and password) (STEP 1g) and the brokerage account is active and ready for use by the applicant/user.

The present invention is described herein in terms of functional block components (FIG. 1), flow charts (FIG. 2), and screen shots (FIGS. 3-12). It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, JavaScript, VBScript, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference. For additional information on communication systems, see Gilber Held, Understanding Data Communications (1996); Dilip Naik, Internet Standards and Protocols (1998); and Java 2 Complete, various authors (Sybex 1999); all of which are hereby incorporated by reference. An additional application relating to application processing systems and processes is U.S. Provisional Patent Application Ser. No. 60/268,538 filed on Feb. 13, 2001, which is hereby incorporated by reference.

As referred to generally above and as shown in FIG. 1, the Applicant 1 includes any individual, business, software, hardware, or other entity applying for an account (e.g., brokerage account) utilizing the systems and methods herein described. Applicant 1 may also be referred to as "user" or "investor." In one embodiment, the application process is over a distributed network (e.g., internet). As those skilled in the art will appreciate, the Applicant's computer system 10 typically comprises a computer processor, memory elements, and a means, such as any modem or network device for connecting to a distributed network. The computer system 10 will typically include an operating system (e.g., Windows NT, XP, 95/98/2000, Linux, Solaris, etc.) as well as various conventional support software and drivers typically associated with computers. The computer system 10 may be in a home or business environment with access to a network. In an exemplary embodiment, access is through the Internet through a commercially-available web-browser software package. The computer system 10, however, is not limited to a home or work personal computer. The computer system 10 includes any processor or microchip-enabled device that is capable of connecting to any distributed network to communicate with the systems of the present invention. As such, the computer system 10 may interact with the host system Web Server 110 and/or directly or indirectly with the Application Server 120 via any communication device such as a telephone, keyboard, touch screen, voice recognition, electronic kiosk, ATM, hand-held computer, personal data assistant, wireless device, mobile phone, web TV, web phone, blue tooth/beaming device, point of interaction device (POS) and/or the like.

The distributed network 20, as defined herein, includes any type of computerized network capable of facilitating communication between the parties to the account application process (e.g., the Applicant 1) and the systems and components of the present invention (e.g., Web Server 110 or Application Server 120). Communication is accomplished, as noted above, through any suitable communication means, such as, for example, a telephone network, Intranet, Internet, wireless communications, direct dial connection and/or the like. It will be appreciated that many applications of the present invention could be formulated. One skilled in the art will appreciate that a network may include any system for exchanging data or transacting business, such as the Internet, an intranet, an extranet, WAN, LAN, satellite or wireless communications, and/or the like. The computing units may be connected with each other via a data communication network. In the illustrated implementations, the network is embodied as the internet 20. In this context, the computers may or may not be connected to the internet 20 at all times. For instance, the Applicant's computer system 10 may employ a modem to occasionally connect to the internet, whereas the host Web Server 110 computing environment might maintain a permanent connection to the internet 20. The network may be implemented as other types of networks, such as an interactive television (ITV) network.

The host system Web Server 110, is an exemplary user interface device which may provide a suitable website or other Internet-based graphical user interface which is accessible by users. In one embodiment, Netscape Enterprise Server (any suitable application server supporting JAVA servlets) may be used. Other embodiments may utilize the Microsoft Internet Information Server, Microsoft Transaction Server, and Microsoft SQL Server, in conjunction with the Microsoft operating system, a Microsoft SQL database system. Additionally, components such as Access Sequel Server, Oracle, MySQL, Interbase, Sybase, etc., may be used to provide an ADO/JDBC-compliant database management system. The term "webpage" as it is used herein is not meant to limit the type of documents and applications that might be used to interact with the user. For example, a typical website might include, in addition to standard HTML documents, various forms, Java applets, Javascript, Active Server Pages (ASP), Java Server Pages (JSP), Common Gateway Interface scripts (CGI), extensible markup language (XML), dynamic HTML, cascading style sheets (CSS), helper applications, plug-ins, and the like. In addition, to provide load balancing and fail-over, load controllers may be placed in front of the web servers 110 and between the web servers 110 and the application servers 120. Also depicted in FIG. 1 is an additional Web Server 115. In an exemplary embodiment, one Web Server 110 is utilized on the front-end of the account application system and another Web Server 115 is utilized on the front-end of the trading system. As can be appreciated, the present invention can be configured with any suitable user interface system, and any number of user interface systems, which allow for communication between the Applicant 1 and the Host System 100.

The Application Server 120, as defined herein, includes any type of host server or other computing system including a processor for processing digital data, a memory coupled to said processor for storing digital data, an input digitizer coupled to the processor for inputting digital data, and an application program stored in said memory and accessible by said processor for directing processing of digital data by said processor. Similarly, the real-time account application system, in general, could be used in conjunction with any type of computer, network computer, workstation, minicomputer, mainframe, or the like running any operating system such as any version of Windows, MacOS, OS/2, BeOS, Linux, UNIX, or the like. Moreover, although the invention may use protocols such as TCP/IP, RMI, RSC, RPC, XML, HTTP; and transports/messaging brokering service such as MQ, and/or the like, to facilitate network, middleware, and/or backend communications and the like, it will be readily understood that the invention could also be implemented using IPX, Appletalk, IP-6, NetBIOS, OSI or any number of existing or future protocols or platform services, such as SOAP, WDSL, UDDI and/or the like. Various other known in the art methods and protocols may be used to facilitate communication between the host system server systems and other internal or external systems.

The Workflow System 150 is server/database computer system configured to facilitate the manual processing of applications which are not automatically processed. The primary function of the Workflow System 150 is to process and facilitate requests that are not automatically processed by the application server 120. As such, the Workflow System 150 is configured to allow application data to be captured and available for manual processing in the event that a particular applicant is not approved or when an error in the automated processing occurs.

The Account Database System 112, referenced for illustration and enablement purposes in FIG. 1, shows one database device, however any suitable data structure or combination of structures, memory elements, and/or the like is appropriate. Specifically, "database" as used herein may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables. Association of certain data may be accomplished through any data association technique known and practiced in the art One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The Credit Bureau System 210 includes any hardware and/or software systems utilized by any individual credit bureau or agency as well as credit organizations. The Credit Bureau System 210, as referenced herein, may include one or many credit bureaus or agencies, such as Experian, Equifax, NCO (National Credit Organization), etc. In an exemplary embodiment, the Host System 100 provides the Credit Bureau System 210 with business rules which are applied against the Applicant's retrieved credit score. In other words, the Host System 100 provides the Applicant's 1 personal data (name, address, income, etc.) to the Credit Bureau System 210 for evaluation and credit decisioning. The Credit Bureau System 210 retrieves the Applicant's credit report information and compares that information against pre-defined business rules. This decisioning process enables the Credit Bureau System 210 to evaluate the Applicant's 1 credit worthiness in a real-time environment and provide a credit decision, from which the host system will then open an account or return an error message to the Applicant 1. Although the embodiment contemplated in FIG. 1 depicts the Credit Bureau System 210 as a third-party system, it should be appreciated that the Credit Bureau System 210 may be part of the Host System 100, where the host system accesses its own system of records for account decisioning.

In an exemplary embodiment a distributed credit bureau communication system (also known as a credit bureau interface(CBI)) is used. With this embodiment, the Application Server 120 may access a separate CBI component configured to communicate with various credit bureau systems. As such, the Application Server 120 issues a request to the CBI with relevant application data and a unique identifier. The data required for the particular account application is transmitted to the CBI in a format that is natively defined, by using, for example, Java Programming language constructs. The protocol of communication between the CBI and the Application Server 120 is, for example, RMI. The CBI component generally processes the Application Server 120 requests to the Credit Bureau System 210 as it receives them. The CBI communicates with the Credit Bureau System 210 in a manner recognized by the CBI, e.g., MQ or TCP/IP. The request is then processed by the Credit Bureau System 210, passed through the CBI and presented to the Application Server with a response that is defined by using, for example, the native Java programming language constructs.

The Securities Processing System 190 is a system of record for managing brokerage accounts and the execution of transactions. The Securities Processing System 190 is any computer system comprising hardware, software, database configurations, and/or the like for managing account data. Furthermore, the Securities Processing System 190 is configured to communicate with the Application Server 120 and the Trading System 310 to facilitate online account management and trading for the Applicant 1.

The Trading System 310 is any hardware, software, system, business, company and/or the like capable of facilitating trades for the Applicant 1. Any known in the art trading systems capable of communicating with the Host System 100 in a real-time environment, and suitably licensed to facilitate consumer trading, may be utilized. Although FIG. 1 depicts the Trading System 310 as a entity separate from the Host System 100, other embodiments contemplate the trading system as a integrated component of the Host System 100.

The automated real-time account application process, as shown in FIGS. 1 and 2 and further illustrated by the screen shots in FIGS. 3-12, are now described in greater detail. The Applicant 1 must first be able to apply for the brokerage account. As such, a Web Server 110 facilitates communication with the Applicant 1 (via a user's computer system 10) over a distributed network 20 such as the internet. In general, the applicant selects account type and preferences and then submits personal data (e.g., name, address, income, employment, etc.) for processing (STEP 82, FIG. 2). The Web Server 110 captures data from the Applicant 1 and passes this information to an Application Server 120 (STEP 84, FIG. 2), which generally facilitates the storage, routing and processing of account data. The Application Server 120 serves as the hub for account processing. To facilitate a credit decisioning process, the Application Server 120 communicates application data to one or more credit bureau computer systems 210 (STEP 86, FIG. 2).

In response to the Application Server's request, the Credit Bureau System 210 receives the application data and evaluates the data by applying the host system's 100 business rules to the particular Applicant 1. The Credit Bureau System 210 then returns an approval code to the Application Server 120, reflecting the Applicant's approval status (STEP 88, FIG. 2). In an exemplary embodiment, to facilitate the real-time application process, the Host System 100 sets various response-time parameters for its sub-systems and third party participants. For example, if the Credit Bureau System 210 does not respond within a predefined period of time (e.g., 60 seconds), the process "times-out" and an error message is returned to the Applicant 1. If the Applicant 1 is not approved during this automated real-time process (e.g., process "times-out" or a negative approval code returned), the Applicant 1 is informed that the system was unable to automatically process the request, whereupon the information is passed to the Workflow System 150 for manual processing (STEP 90, FIG. 2). If the Applicant 1 is approved via the real-time process just described, one or more account databases 112 are accessed by the Application Server 120 to open, for example, a brokerage account with a pre-established trading limit (e.g., $15,000) and associate the account with the approved Applicant 1 (STEP 92, FIG. 2).

The brokerage account with a pre-established trading limit is then activated by communicating with a Securities Processing System 190. This Securities Processing System 190 is any hardware and/or software configured to communicate with a Trading System 310 to activate an account. In communication with a trading system, user authentication information is retrieved. One skilled in the art will appreciate that various other authentication codes, methods, technology or procedures may be used instead of, or in addition to, username and password, such as, for example, smart cards, PIN numbers, biometric data and/or the like. In one embodiment, a username and password is provided to the Applicant 1 (STEP 94, FIG. 2), with the Application Server 120 managing the workflow between the securities processing system and the Applicant 1. This username and password may then be used by the Applicant 1 to access the brokerage account and place an order (STEP 96, FIG. 2). Any suitable interface protocols, processes, methods and/or devices, which are known in the art, may be used to facilitate communication and interaction between the various system components. To facilitate the separate application and trading processes, the present invention may be configured with separate user interface systems, such as a Web Server 110 on the front-end of the application process and Web Server 115 on the front-end of the trading process.

The above described account application process is preferably accomplished in a substantially real-time environment. For example, in an exemplary embodiment, the application process from submission of data to the credit bureau 210 to the opening of an active account capable of executing trades takes no longer than approximately two minutes, although other embodiments exceeding a two minute application process are possible taking into account system throughput, traffic, Applicant response, field completion times, etc. However, while the system will be described as "real-time", one skilled in the art will appreciate that any of the functions may be performed in other modes, such as, for example, batch processing.

Turning now to brief overview of an embodiment of the application process from an Applicant's 1 perspective, exemplary web page screen shots are depicted in FIGS. 3-12. Although one of ordinary skill in HTML/Java/CGI/XML/JSP/ASP programming will understand the multitudes of possibilities for forming web pages, requesting Applicant data (e.g., setting or getting attributes), formatting and sending to appropriate database and server systems, an exemplary process is hereafter described.

Figure 3:
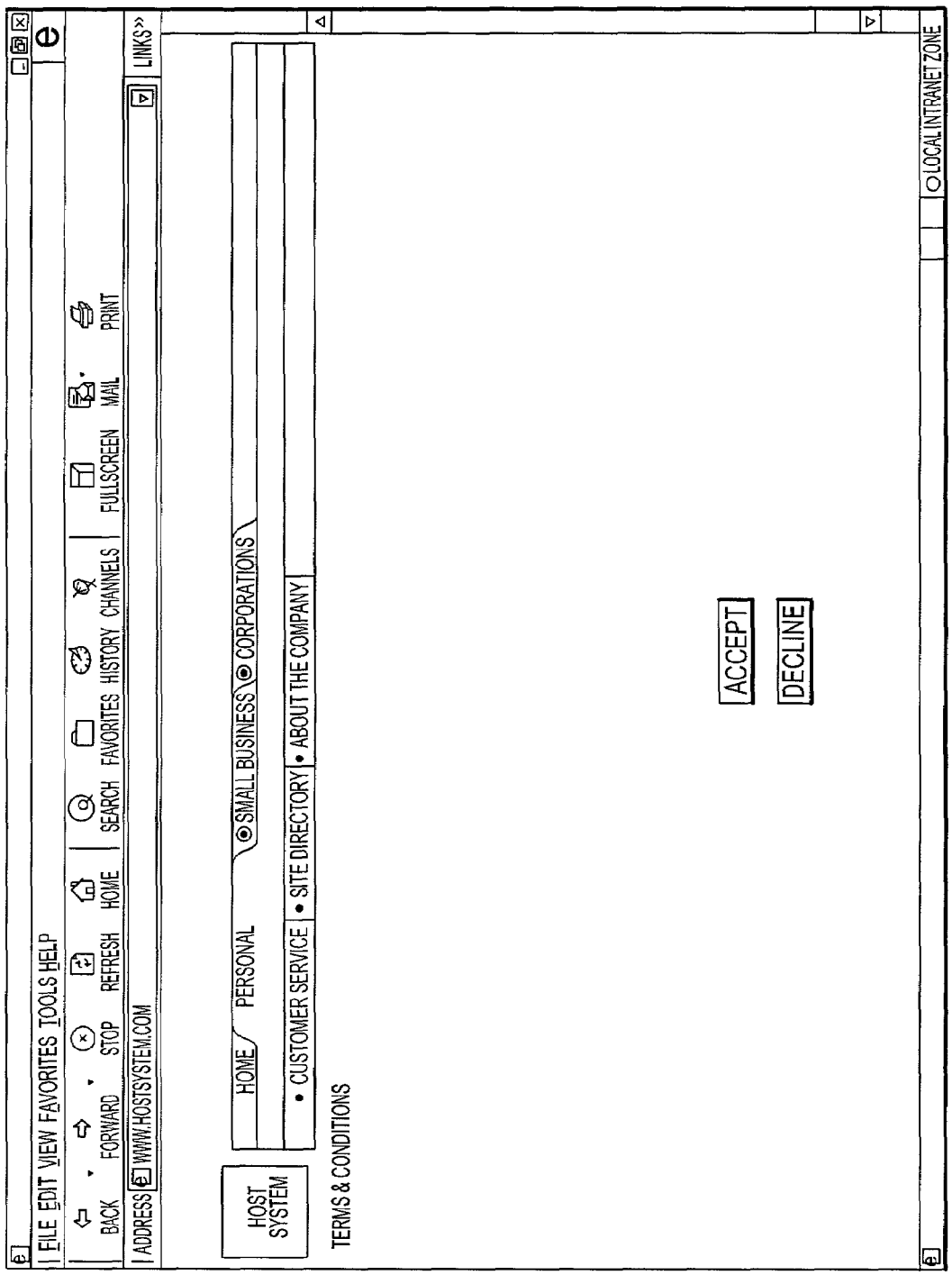
Figure 4:
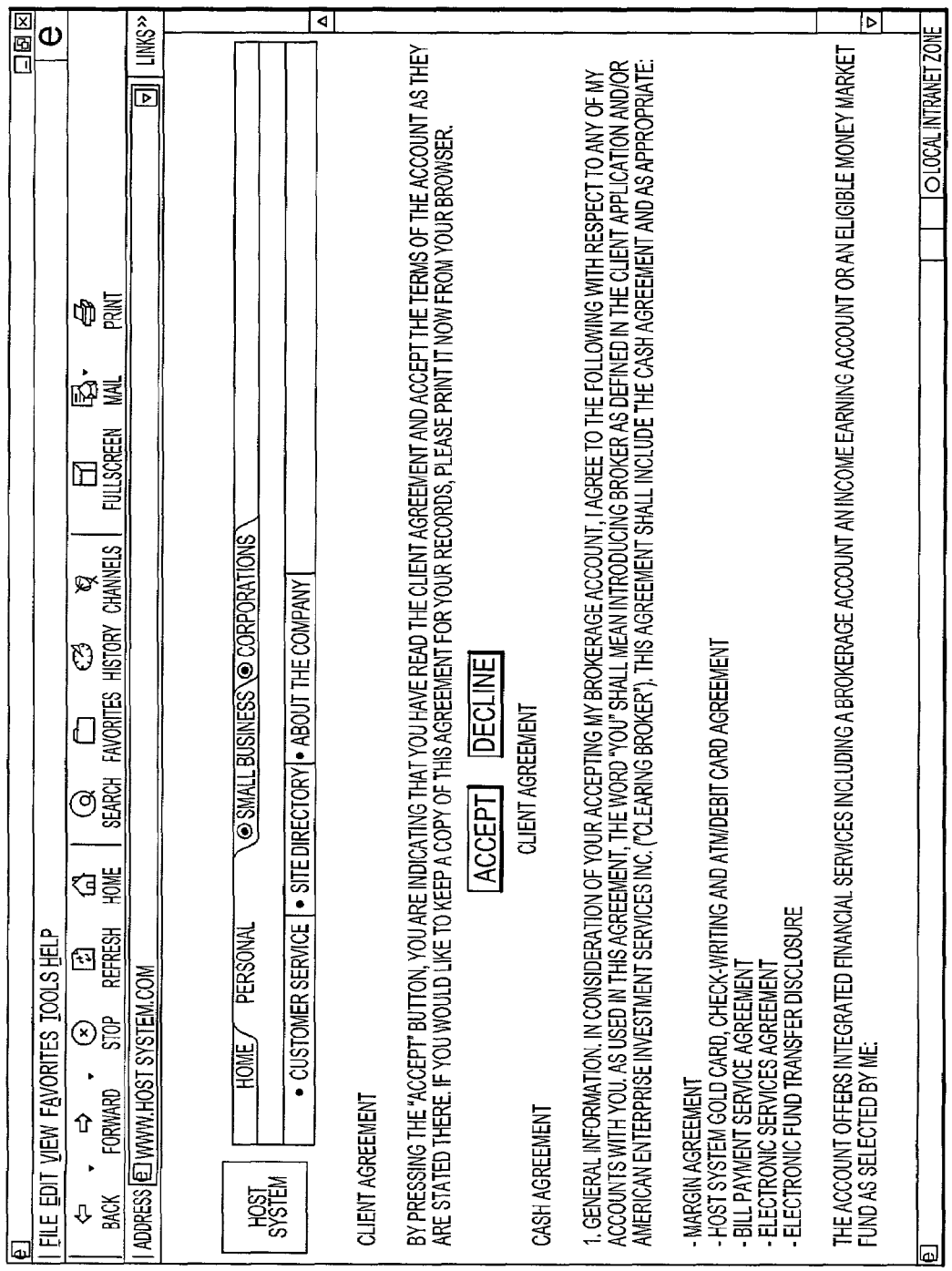

Applicant 1, upon accessing an online brokerage website and choosing to apply for a brokerage account is presented with and is given the option of accepting electronic delivery of a prospectus (FIG. 3). The Applicant 1 is then presented with a client/applicant agreement (FIG. 4). Terms generally inform the Applicant that all trades must be placed in a cash account and full payment received by settlement date (usually three business days after trade execution) and that trades cannot be placed on margin. Additionally, restrictions on immediate trading include mutual funds, stocks under $5, certain infrequently traded OTC stocks, and certain Internet-related stocks. Regarding an Applicant's 1 signature, an E-signature may be used in place of an original signature if the Applicant 1 selects to accept the electronic submission of their name as their signature.

Figure 5:
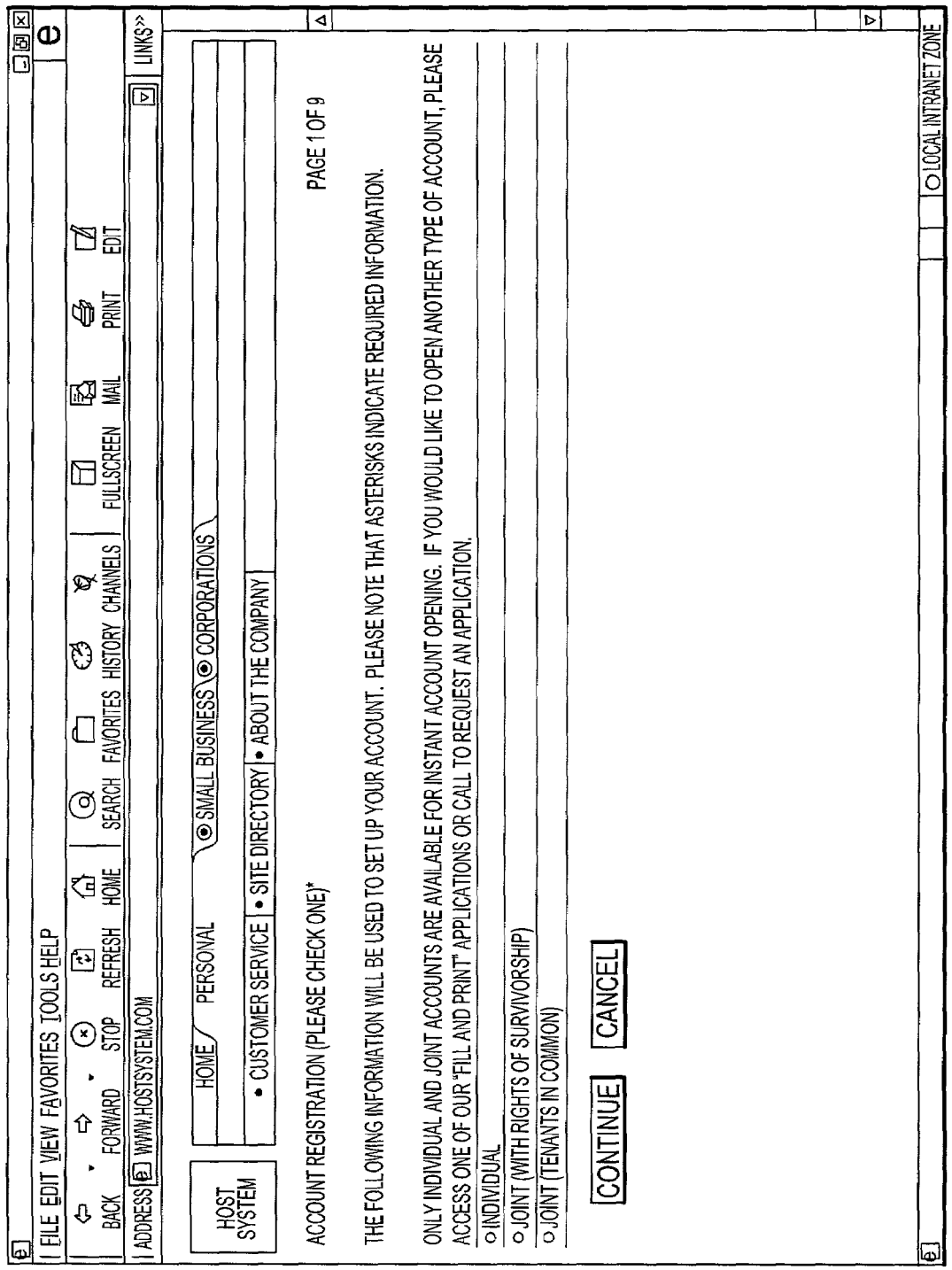
Figure 11:
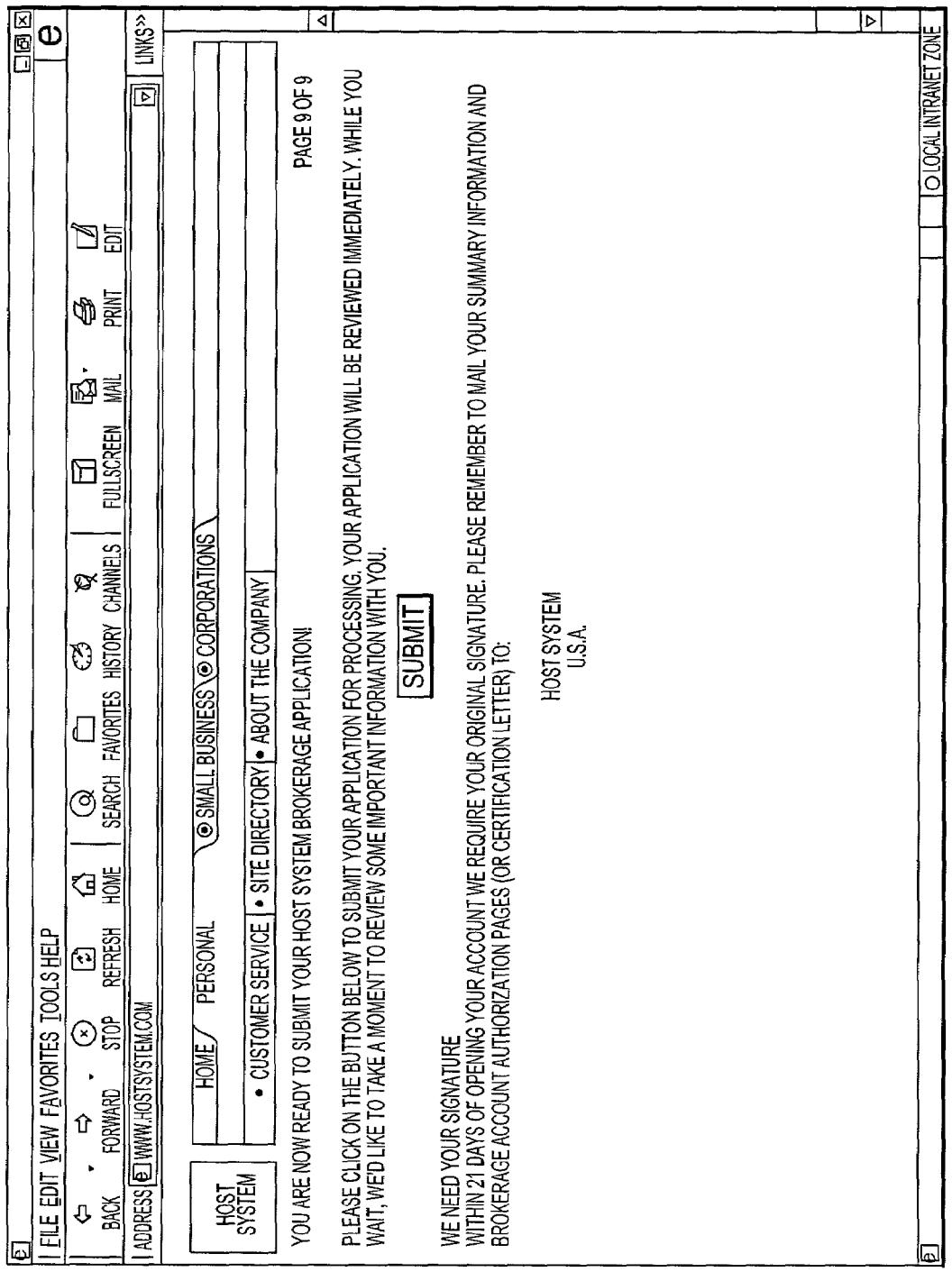

Upon agreeing to the terms of this brokerage agreement, account registration follows, where the Applicant 1 is prompted to select or enter information into various fields, such as, for example, a desired account type (e.g., individual, joint (with rights of survivorship), or joint (tenants in common))—see FIG. 5. FIG. 6 depicts exemplary fields for "employment information." FIG. 7 depicts exemplary fields for "financial information." FIG. 8 depicts exemplary fields allowing the Applicant 1 to select from exemplary account features. For example, the Applicant 1 may choose from "initial account funding options" such as check, wire transfer, account transfer, etc. and may choose "money settlement options" such as American Express® Cash, U.S. Government, etc. FIG. 9 depicts an exemplary brokerage account authorization that, in an exemplary embodiment, may be signed and forwarded (e.g., mailed or faxed) to the host system within a predefined period of time. FIG. 10 depicts an exemplary screen shot of a confirmation page, where the Applicant 1 is prompted to confirm the previously entered information. This preview screen allows the Applicant 1 to review the data that he or she has entered and make modifications prior to submitting for approval. If the information is correct, the Applicant 1 selects "continue" to proceed to the final submission page. In an exemplary embodiment, as shown in FIG. 11, upon selection of the "submit" button, the Web Server 110 executes an appropriate servlet to capture the data, open a new account and invoke remote methods to pass account data as necessary. Alternatively, the data may be captured by the Web Server 110 or the Application Server 120 as the data is entered and the "continue" button selected, with the "submit" button serving as the final indicator that the information is correct and queuing the appropriate method to send the information to the Credit Bureau System 210.

Figure 12:
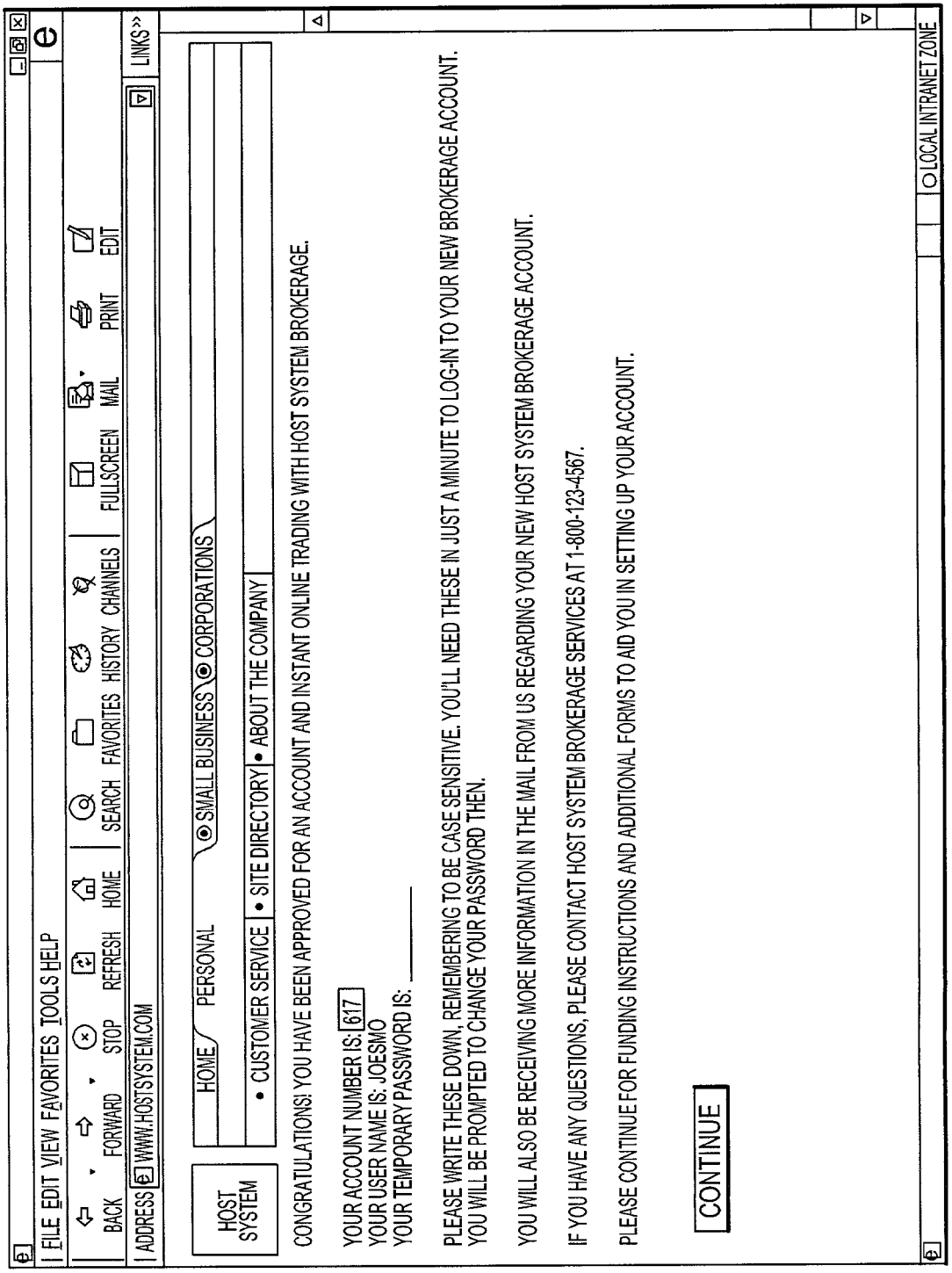

Suitable protocols or transports may be used for passing the application data to a Credit Bureau System 210 for decisioning, receiving an approval code, and opening an account. In an exemplary embodiment, as previously discussed, a distributed credit bureau communication system (also known as a credit bureau interface), is utilized for communicating with a credit bureau system, where the distributed credit bureau communication system is a plug in component available for use by various real-time application systems. In evaluating the account application, various rules may be established for processing and establishing the account. For example, rules may prohibit Applicants 1 from opening multiple accounts, being affiliated with a broker, owning more than 10% of a company, etc. Once approved, the account information is passed, utilizing any suitable remote method, to the Securities Processing System 190 (which communicates with the Trading System 310) to activate the account. In an exemplary embodiment, the username and temporary password is retrieved from the Trading System 310. Once activated, the Applicant 1 is provided with the account number and an authentication means such as a username and password. In an exemplary embodiment, the Application Server 120 is called to compile the information from the Credit Bureau System 210, Account Database System 112, Securities Processing System 190 and the Trading System 310. FIG. 12 illustrates an exemplary approval page indicating that the application has been processed, approved, and Applicant 1 is authorized to begin trading.

A number of programming methods may be implemented to facilitate the above processes. For example, various distributed calls or methods may be invoked to process the several steps desired to approve Applicant and open/activate the account. A program, distributed call, or other method may handle the processes by invoking several distributed calls or methods for the various processes. One method may call other methods to call the Credit Bureau System 210, open the account, call the Securities Processing System 190 to activate the account, and call the Trading System 310 to obtain the user authentication information to allow trading. In an exemplary embodiment, a method for opening and activating an account comprises the creation of a connection object to invoke a method to determine if application has been already submitted. If an application has not already been submitted, a call is made to the Credit Bureau System 210, whereupon a data object is passed from the Host System 100 to the Credit Bureau System 210. Although numerous transfer protocols may be appropriate, in an exemplary embodiment, the credit request is converted to XML format and sent to the Credit Bureau System 210 over an MQ channel. The Credit Bureau System 210 distributed call causes an audit log to be generated, queries the appropriate database for account type, invokes the appropriate transmission protocol to communicate with the Credit Bureau System 210 and awaits a return value from the Credit Bureau System 210, which corresponds to the data object transmitted. If, for example, the Credit Bureau System 210 returns a code for opening an account, a "create account" distributed call is invoked, which again writes an audit log, queries database for account type and retrieves an appropriate account number.

Upon opening the account, a Securities Processing System 190 distributed call is called to activate the account. If the account is successfully opened, a distributed call is made to the Trading System to obtain a username and password.

It should be appreciated that the particular implementations shown and described above are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in exemplary online brokerage account application systems.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

Computer program instructions may also be stored in a computer-readable memory that can direct a computer or other programmable data processing apparatus to function in a particular manner, such that the instructions stored in the computer-readable memory produce an article of manufacture including instruction means which implement the function specified in the schematic block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the schematic block or blocks.

Accordingly, functional blocks of the block diagrams and schematic illustrations support combinations of means for performing the specified functions, combinations of steps for performing the specified functions, and program instruction means for performing the specified functions. It will also be understood that each functional block of the block diagrams and schematic illustrations, and combinations of functional blocks in the block diagrams and schematic illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

We claim:

1. A computer-implemented brokerage account application method comprising the steps of:
    receiving, at a host server, a request to establish a brokerage account including data related to an applicant;
    forwarding, by said host server, said data to a credit bureau system for credit decisioning;
    obtaining, in a real-time environment, a credit decision relating to said applicant from said credit bureau system at said host server;
    in response to a favorable credit decision and said request, establishing a brokerage account with a line of credit for said applicant, wherein said brokerage account is established in real-time via said host server and through a solely automated process;
    based upon said establishing said brokerage account, granting, through a solely automated process, real-time access to at least one of: buy, sell, and trade within said brokerage account prior to receiving payment from said applicant for an investment; and,
    facilitating, through said solely automated process, said at least one of buy, sell, and trade within said brokerage account using said line of credit and prior to receiving said payment from said applicant for said investment.

2. The method of claim 1, wherein the step of forwarding said data is accomplished utilizing a distributed credit bureau communication system.

3. The method of claim 1, wherein the step of receiving data from said applicant comprises receiving data from said applicant over a distributed network.

4. The method of claim 1, wherein the step of establishing said brokerage account comprises opening said brokerage account with a pre-established trading limit.

5. The method of claim 1, further comprising the step of capturing data in an accounts database.

6. The method of claim 5, further comprising the step of formatting said captured data into a format acceptable by said credit bureau system.

7. The method of claim 1, wherein the steps are performed in real-time.

8. The method of claim 1, further comprising facilitating communication with a trading system to obtain user-authentication information used for trading.

9. The method of claim 8, wherein the step of facilitating communication with a trading system to obtain user-authentication information comprises facilitating communication with said trading system to obtain at least one of a username and a password.

10. The method of claim 1, wherein the step of obtaining a credit decision comprises obtaining a credit decision from said credit bureau in less than two minutes from when said data was forwarded to said credit bureau.

11. A computer-implemented real-time brokerage account application method comprising the steps of:
    providing an online brokerage application website via a host server;
    electronically receiving brokerage application data from an applicant over a distributed network;
    capturing application data in a host system database;
    formatting said application data, by said host computer, into a format accepted by a credit bureau;
    forwarding said formatted application data, by said host server, utilizing a distributed credit bureau communication system, to said credit bureau for real-time account decisioning;
    receiving a credit decision from said credit bureau at said host server, said credit decision relating to said formatted application data;
    in response to a favorable credit decision and said brokerage application, invoking a securities processing system to establish a brokerage account with a line of credit and with a pre-established trading limit;
    based upon said establishing said brokerage account, granting, through a solely automated process, real-time access to at least one of: buy, sell, and trade within said brokerage account prior to receiving payment from said applicant for an investment; and,
    facilitating, through said solely automated process, said at least one of buy, sell, and trade within said brokerage account using said line of credit and prior to receiving said payment from said applicant for said investment.

12. A brokerage account application system comprising:
    a securities processing system configured to communicate with a trading system to establish, through a solely automated process, a brokerage account with a line of credit in response to a favorable credit decision from a distributed credit bureau communication system in real-time, wherein said distributed credit bureau communication system is configured to accept account application data and communicate said account application data to a credit bureau, wherein a web server system communicates with an applicant to post and receive, over a distributed network, said account application data from said applicant;
    said securities processing system configured to grant, through a solely automated process and based upon said establishing said brokerage account, real-time access to least one of: buy, sell, and trade within said brokerage account prior to receiving payment from said applicant for an investment; and,
    said securities processing system configured to facilitate, through said solely automated process, said at least one of buy, sell, and trade within said brokerage account using said line of credit and prior to receiving said payment from said applicant for said investment.

13. The brokerage application system of claim 12, wherein an application server processes said application data and interfaces with said distributed credit bureau communication system, wherein said distributed credit bureau communication system receives said application data and generates said credit decision and an approval notification in response thereto.

* * * * *

UNITED STATES PATENT AND TRADEMARK OFFICE
CERTIFICATE OF CORRECTION

PATENT NO.       : 7,480,633 B2
APPLICATION NO.  : 10/032588
DATED            : January 20, 2009
INVENTOR(S)      : Chow et al.

Page 1 of 1

It is certified that error appears in the above-identified patent and that said Letters Patent is hereby corrected as shown below:

On the title page item (75), insert -- Can DemirKaya --

Signed and Sealed this

Twenty-fourth Day of March, 2009

JOHN DOLL
*Acting Director of the United States Patent and Trademark Office*